United States Patent [19]
Hughes

[11] 3,910,305
[45] Oct. 7, 1975

[54] AIR REGULATOR FOR TIRES
[76] Inventor: George W. Hughes, 2601 Mills, Houston, Tex. 77026
[22] Filed: July 5, 1974
[21] Appl. No.: 486,236

[52] U.S. Cl. .................. 137/224; 137/530; 137/539
[51] Int. Cl.² .......................................... F16K 15/20
[58] Field of Search ........... 137/224, 530, 539, 223, 137/226, 531

[56] References Cited
UNITED STATES PATENTS

| | | | |
|---|---|---|---|
| 1,563,545 | 12/1925 | Blakeslee | 137/539 |
| 1,934,571 | 11/1933 | Sutton | 137/224 |
| 1,939,249 | 12/1933 | Berger | 137/224 |
| 2,722,400 | 11/1955 | Bardill | 137/539 X |
| 3,288,142 | 11/1966 | Hakim | 137/539 X |

*Primary Examiner*—Harold W. Weakley
*Attorney, Agent, or Firm*—Ranseler O. Wyatt

[57] ABSTRACT

An air regulator for the valves on tires, consisting of a tubular member to be mounted on the valve stem, and on which an annular band, mounted with a ball seated in an orifice in the side wall of the tubular member, said band having a plurality of indentations of varying depths to provide a selection of pressure relief levels, one end of said tubular member being open and the other end being enlarged and internally threaded to receive the threads of a valve.

1 Claim, 3 Drawing Figures

AIR REGULATOR FOR TIRES

BACKGROUND OF THE INVENTION

In pneumatic tires, particularly in bicycle tires, the tire, both with tubes and the tubless type, are much smaller than automobile tires, and can not take the pressure that is applied to automobile tires. Most bicycle users use service station air hoses to fill their tires, which hoses are designed for inflating automobile tires of much greater size, and unless great care is taken, the high pressures delivered by these hoses will blow out the tire. This is particularly true where children are doing the inflating. It is an object of this invention to provide a safety device to be attached to the valve stems of bicycle tires, which will prevent such blowouts by opening upon the preselected pressure being reached, and permitting the excess pressure to escape into the atmosphere.

SUMMARY OF THE INVENTION

An air regulator for bicycle tires consisting of a tubular member having one end internally threaded to be received on a tire stem, and having a pressure relief valve mounted in the side wall of said tubular member, adjustable to one of several levels of pressure, to permit any excess pressure to escape into the free atmosphere.

DESCRIPTION OF THE PREFERRED EMBODIMENT

Figure 1:
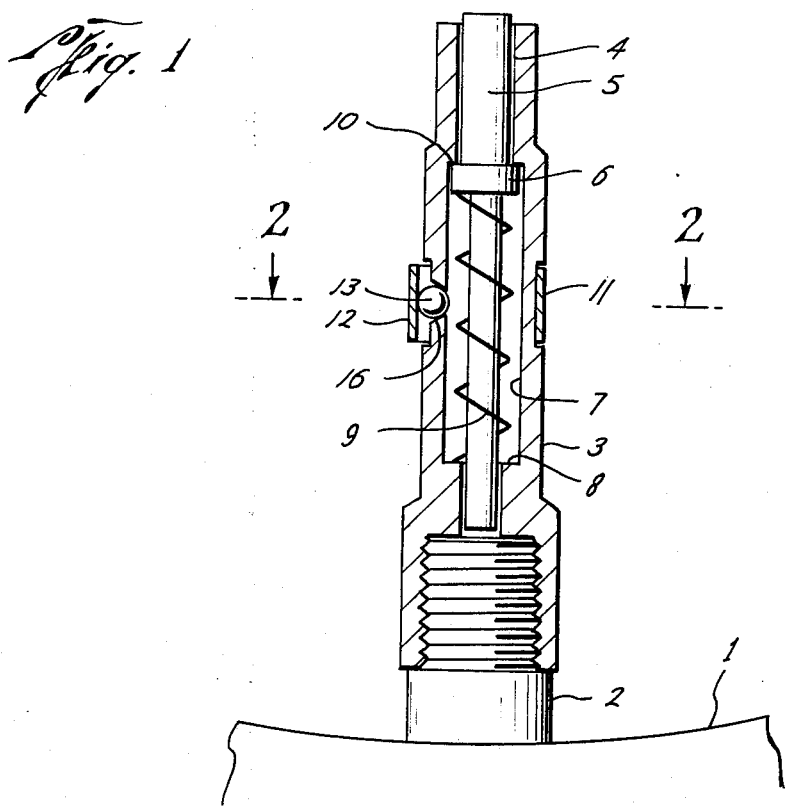
FIG. 1 is a side elevational view, in cross section, of the device mounted on a valve stem.

In the drawings the numeral 1 designates a tire, such as a bicycle tire, having the usual valve 2 which is externally threaded over the most of the extended portion of said stem. The regulator consists of the tubular member 3, which has the axial air passageway 4 in which the plunger 5 is mounted, said plunger 5 having the annular flange 6, which reciprocates in the enlarged chamber 7 in the tubular member. The lower end of the chamber 7 forms the shoulders 8 against which the lower end of the spring 9 abuts, the upper end of the spring 9 abutting the shoulder 10 formed in the upper end of the chamber 7. The plunger 5 extends downwardly through the passageway 4, in position to contact the valve stem (not shown) in the valve 2.

On the outside wall of the tubular member 3 is an annular groove 11 and the band 12 fits in this annular groove 11, and is indented at various degrees of indentation as the indentations 14, 15. A ball 13, is mounted in an orifice 16 formed in the side wall of the tubular member 3, and in communication with the axial passageway 4, and the band 12 fits over this ball 13, holding the ball seated in the orifice 16. The band 12 is formed of flexible material, such as a flat metal band having a spring tension, and the ends of the band 12, as 17, 18, are free to move in the groove 11, as the band is moved from one position to another and as excess pressure is applied to the ball.

Figures 2, 3:
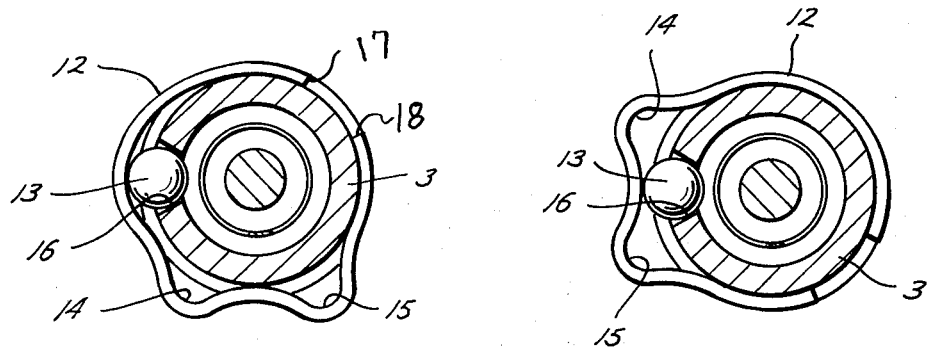
FIG. 2 is an end view, in cross section, taken on the line 2—2 of FIG. 1.
FIG. 3 is an end view, in cross section, showing the band in another position.

The member 3 is mounted on the threads of the valve 2 and when seated tightly thereon, the lower end of the plunger 5 will be adjacent the upper end of the valve stem within the valv 2. The band may be moved to one of the positions shown, the position shown in FIG. 2 being for the highest pressure, and the lesser pressures may be served by turning the band to one of the indentations 14, 15. When an air hose is applied to the upper end of the member 3, the plunger 5 will be depressed, in turn depressing the valve stem in the valve 2, and permitting air to flow into the tire. When the desired pressure is reached, the ball 13 will be foreced outwardly, and the excess air permitted to escape through the orifice 16 into the atmosphere.

What I claim is:

1. In an air regulator for tires, a tubular member to be mounted on the valve stem of a tire, a longitudinal axial air passageway through said member, a plunger mounted in said passageway yieldably maintained in closed position and movable into open position by application of an air hose to the upper end of said tubular member, an orifice in the side wall of said tubular member in communication with said axial air passageway and a valve in said orifice in the side wall of said tubular member consisting of a ball seated in said orifice, an annular groove in said tubular member and a yieldable band mounted in said groove and extended over said ball, a plurality of indentations in the said band of varied depth to permit a selection of pressure level at which said ball will be moved off of said seat to permit excess air to pass through said orifice to the free atmosphere.

* * * * *